United States Patent [19]

Coyne et al.

[11] Patent Number: 4,631,364

[45] Date of Patent: Dec. 23, 1986

[54] COMMUNICATION SYSTEM HAVING DYNAMICALLY ASSIGNED STATION SET BUTTONS

[75] Inventors: Joan H. Coyne, Holmdel; David J. Dooling, Fair Haven; Louis E. Miller, Howell, all of N.J.; Robert D. Nalbone, Boulder, Colo.

[73] Assignee: AT&T Information Systems Inc., Holmdel, N.J.

[21] Appl. No.: 582,850

[22] Filed: Feb. 23, 1984

[51] Int. Cl.[4] ..................... H04M 3/42; H04M 3/545
[52] U.S. Cl. ................................... 379/164; 379/165; 379/268
[58] Field of Search .............. 179/99 R, 99 A, 99 LS, 179/99 M, 99 P, 18 B, 18 BA, 18 BB, 18 BD, 18 BE, 18 BF, 18 E, 18 EB, 18 ES; 370/62, 66

[56] References Cited

U.S. PATENT DOCUMENTS

| | | | |
|---|---|---|---|
| 4,109,113 | 8/1978 | Allison, Jr. et al. | 179/99 R |
| 4,125,748 | 11/1978 | Nahabedian et al. | 179/18 BD |
| 4,150,257 | 4/1979 | Fenton et al. | 179/18 BE |
| 4,196,316 | 4/1980 | McEowen et al. | 179/18 ES |
| 4,246,282 | 10/1981 | O'Neil et al. | 179/99 LS |
| 4,291,199 | 9/1981 | Densmore et al. | 179/18 AB |
| 4,374,308 | 2/1983 | Holesha | 179/99 LS |
| 4,436,962 | 3/1984 | Davis et al. | 179/18 B |

OTHER PUBLICATIONS

"HORIZON ® Communication System: Custom Service for Small Business", by R. R. Desjardins, J. A. Miller and C. D. Weiss, Bell Laboratories Record, vol. 55, No. 10, Nov. 1977, pp. 271-275.

*Primary Examiner*—Thomas W. Brown
*Attorney, Agent, or Firm*—John A. Caccuro

[57] ABSTRACT

There is disclosed a communication system and operating method wherein the manner in which all telephone calls are displayed at a station set allows uniform user operations to originate and terminate those calls. This is accomplished by having all calls dynamically assigned to the same set of general call appearances (buttons on a multibutton station set). There are no call appearances that are dedicated to specific call types. This allows the station set user to perform the same set of operations on all calls by using the same sequence of physical operations independent of the type of call. Additionally, the system may reserve one call appearance button at a station set for special use.

14 Claims, 12 Drawing Figures

STATION STATUS TABLES

FIG. 6

CALL STATUS TABLES

COMMUNICATION SYSTEM HAVING DYNAMICALLY ASSIGNED STATION SET BUTTONS

TECHNICAL FIELD

This invention relates to telephone communication systems and, more particularly, to a method and circuitry for dynamically assigning station set buttons.

BACKGROUND OF THE INVENTION

Some prior art communication systems utilize multibutton station sets having general call appearance (CA) buttons for initiating a first type of call (one using shared facilities) and dedicated CA buttons for initiating a second type of call (one associated with a specific facility). In some of these systems, the number of CA buttons at the station set is exceeded by the number of extensions served by the communication system. To enable a user at a station set to access all of these CO lines, the CA buttons are dynamically assigned on a call basis. No one button is associated with a given CO line. Instead, the CA buttona are assigned in some predetermined order as calls are originated or received.

In these systems, each dedicated CA button is usually assigned to a particular one of a plurality of second call types. These dedicated CA buttons are used for both originating and terminating the second type of telephone call. When originating these second type of telephone calls, the dedicated CA buttons are used, for example, to specify the dialplan to be used (automatic intercom, etc.), simplify billing procedures (secondary extensions), and access specific facilities (personal central office lines). When terminating telephone calls, the dedicated CA buttons are used to indicate the status of a specific facility, or to indicate the party that the caller was trying to reach (secondary extensions, coverage, etc.)

In some systems having dynamically assigned CA buttons and dedicated CA buttons, certain call features, such as conferencing, had to be implemented differently depending on whether the call feature was initiated from a dynamically assigned CA button or a dedicated CA button. This often resulted in the conferenced dedicated CA button remaining tied up if a conference call was ended by a CO party dropping off an intercom connection. Thus, in the prior art when call conferencing and call transfer features were activated, either certain sequences of operations had to be prohibited or the dedicated CA buttons were forced into ambiguous states resulting in user confusion.

Accordingly, it is an objective of our invention to provide a communication system permitting each station set user consistent access to the various call types. It is a further objective to permit users to initiate these call types using a station set having only general CA buttons.

SUMMARY OF THE INVENTION

These and other objectives are accomplished in a telephone communication system by dynamically assigning all calls, independent of whether the call is of the first or second type, to the same set of general call appearance (CA) buttons of a multibutton station set. Optional feature function (FF) buttons (which may replace the dedicated CA buttons or provide other calling features of the system) may be used to assist in terminating and originating the second type of telephone calls. Since all call types appear on the same set of CA buttons, operations such as conference and transfer can be invoked in an identical manner on all call types. Since the general call appearance is not associated with a unique facility (such as personal CO line), conference and transfer cannot force the call appearance into an ambiguous state. According to another aspect of our invention, the system may reserve one CA button at a station set to receive a predetermined one of a second type of call.

BRIEF DESCRIPTION OF THE DRAWING

The foregoing features and objectives together with the operations and utilization of the present invention will be more apparent from the description, taken in conjunction with the drawing, in which.

GENERAL DESCRIPTION—BACKGROUND

Before beginning a general discussion of the specific features claimed, it may be helpful to review in general terms the operation of an overall system in which the claimed feature can be utilized. It should be remembered that such a feature can be used in any number of similar systems and thus only background information on one type of system will be presented. In addition, since communication system features may be used in systems with different hardware constraints and different programming techniques, no attempt will be made to detail the entire program used to control the overall system, as such would cloud the issue and unnecessarily lengthen this specification. Quantities mentioned are engineered for particular response time and memory requirements and will not be the optimum for all such systems.

It will be obvious to one skilled in the art that in order for the invention described and claimed herein to be used with any communication system, the invention must be blended into the overall structure of the system in which it is used and must be tailored to mesh with the features and operations of such a system. Thus, in order to avoid confusion and allow those skilled in the art to utilize the invention claimed herein, this patent specification will concentrate on providing an understanding of the problems and constraints found in a communication system where the invention may be used. The patent specification will describe the operation of the invention using the tables and flow charts which provide the logical steps necessary for the implementation and blending of the described invention into a communication system.

Figure 1:
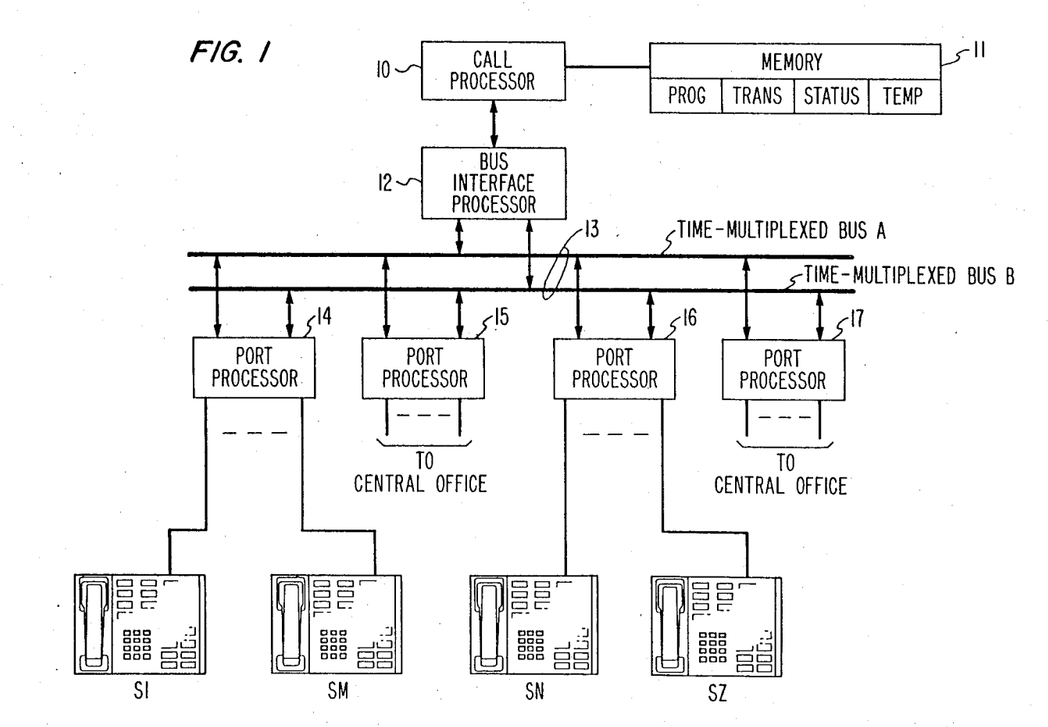
FIG. 1 shows an overall system configuration having several multibutton telephone stations.

One such communication system where the structure claimed herein can be used is a station oriented, stored program control, business communication system. FIG. 1 shows a block diagram of such a system which provides the usual key system features (holds, visual indications, conference, etc.) in addition to providing some of the newer features including the present invention.

The general operation of the system shown in FIG. 1 is as follows. Any change of state is detected by a port processor (e.g., 14) connected to a station set (e.g., S1) or by port processor (e.g., 15) connected to a central office truck. This change information is communicated to the bus interface processor 12 via a control channel on the time-multiplexed bus, 13. The operation of one suitable time-multiplexed bus is described in U.S. patent application Ser. No. 496,484 of R. H. Astman, filed on May 20, 1983. The bus interface processor 12 demultiplexes the information from bus 13 and communicates this state change to the call processor 10. Call processor 10 operates under control of a program stored in memory 11. Call processor 10 using system configuration data (translation) and current state data (status) stored in memory 11, interprets the change of state and issues appropriate commands to updata the status in system memory 11 and station sets S1-SM, SN-SZ, via bus inteface processor 12 and port processors 14–17. The present invention is directed to a method and apparatus for controlling the various system calling features using the multibutton telephone station set shown in FIG. 2.

Figure 2:
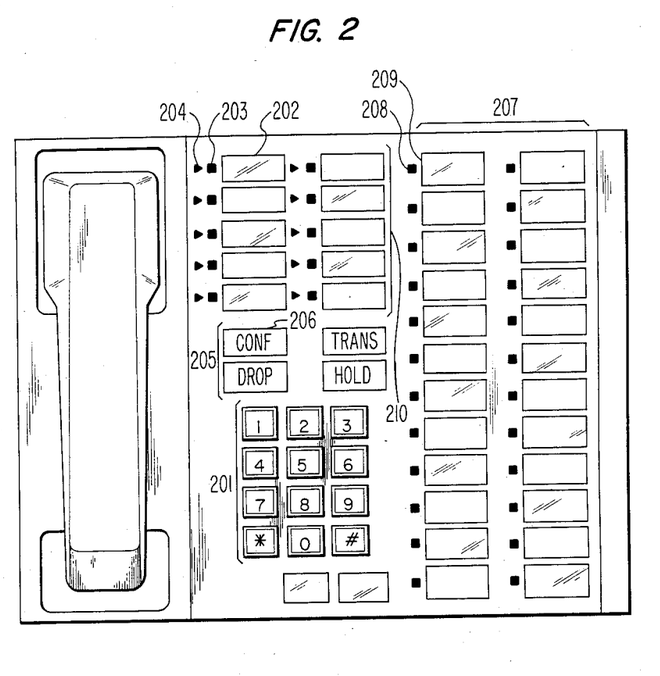
FIG. 2 shows an example of a multibutton telephone station set used with the system.

FIG. 2 shows a typical station set (e.g., S1) used with the communication system shown in FIG. 1. The station set is connected to a port processor (e.g., 14) by a 4 pair cable. The control pair is described in copending U.S. patent application Ser. No. 443,392, filed by T. H. Judd on Nov. 22, 1982 now U.S. Pat. No. 4,454,383 issued on June 12, 1984. The key pad 201 provides dialing capability for the station set. A first type of button for initiating the first type of calls (i.e., CO line calls) is shown in 210. A typical CO line call appearance CA button used to initiate a first type of call is shown at location 202 and includes a green status light-emitting-diode (LED) 203 and a red I-use LED 204.

A typical feature function (FF) button is shown at location 209 and includes a green status LED 208. This second type or group of buttons, called FF buttons 207, may, for example, initiate the second type of calls handled by the station set including the dialing plan to be used (e.g., intercom, simplify billing procedures, second extensions) and access specific facilities (e.g., personal central office lines), or to indicate that there is an incoming special feature call. Note, means other than the FF button can be used for intiating this second type of call at a station (e.g., dialing special access codes, etc). If, for a given application, the only use of the FF buttons/LEDs (207) is for incoming call identification, the FF buttons may be replaced on the station set by an alphanumeric display.

The station set also includes a third type of button called dedicated or feature initiation buttons 205 including a conference button 206 used to initiate the conference feature of the system. Note, means other than this dedicated button can be used for initiating features (i.e., one or more switch hook flashes). However, for the purposes of this invention, if the system does not have these dedicated features the station sets need not have any dedicated buttons or any other means for initiating these dedicated features.

Figure 3:
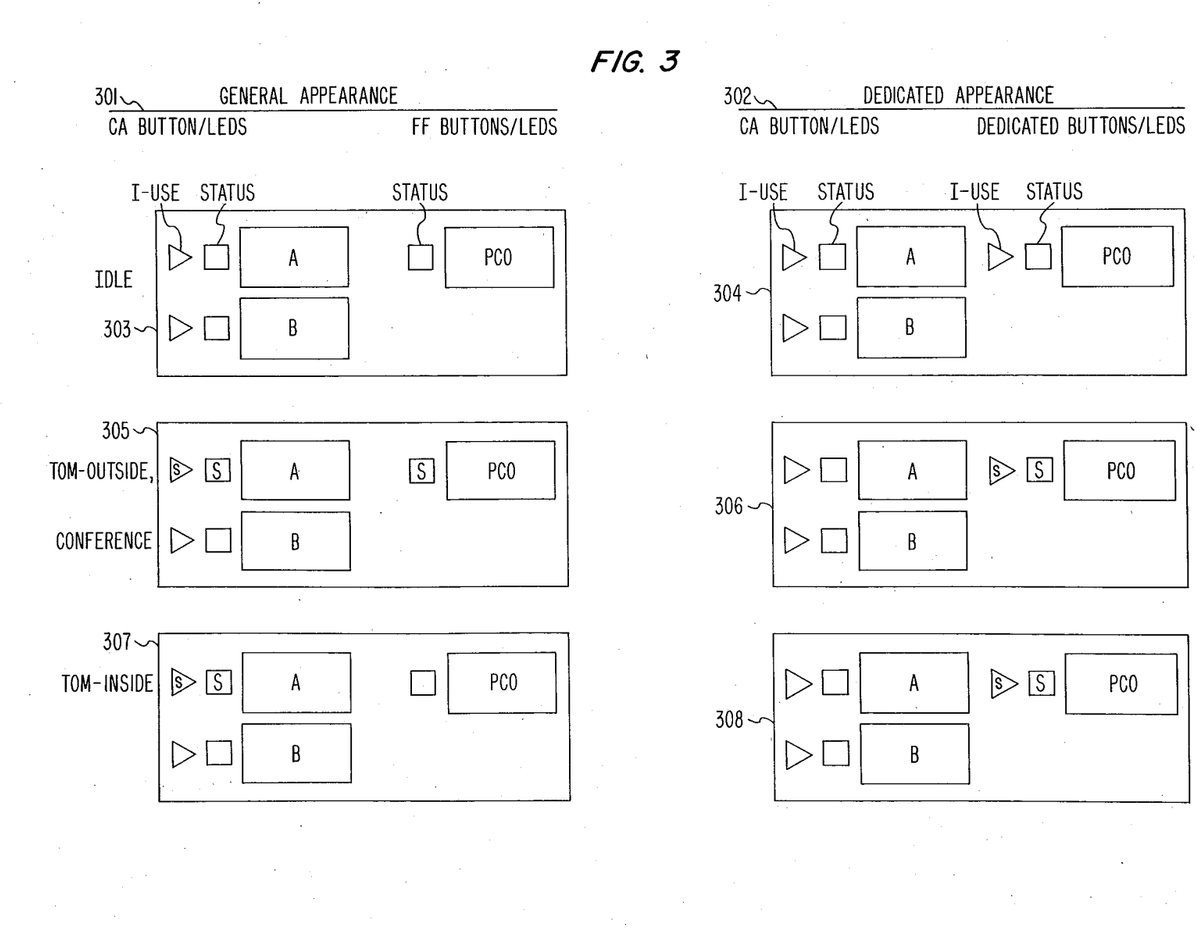
FIG. 3 compares the visual signals at a station set according to the present invention with a prior art system.

Before describing the present invention in detail, it may be helpful to compare the operation of the general call appearance buttons of the present invention with the dedicated call appearance button of prior art systems. With reference to FIG. 3, assume that Tom is a station user, having a personal CO line (PCO). Shown in 301 is the panel of a station set having the disclosed general appearance button and lamp or LED arrangement. Shown in 302 is a prior art panel having a dedicated appearance button and LED arrangement.

During the idle condition, all LEDs for both arrangements are "off" as shown by 303 and 304. When Tom calls an outside party using his personal CO line (PCO), the LEDs on his station set would appear busy as shown in 305 using a general appearance station set and 306 using a dedicated appearance station set. Note that in the dedicated appearance case 306 only the PCO dedicated button LEDs are "on", whereas in the general appearance case 305 the status LED for the PCO and the I-use and status LEDS for a general call appearance button are "on". This occurs according to the invention because any call independent of call type is always dynamically assigned to a general call appearance button. Thus, in 305, the call made on the PCO line is assigned to and connection is made via the call appearance location A. If Tom conferences an inside party into this call via an intercom line, the LED display for the general appearance and dedicated appearance cases remain as shown, respectively, in 305 and 306.

If the outside party on the PCO line hangs up, and Tom and his inside party continue talking, the respective station set LEDs look like 307 and 308. When this happens in the general call appearance case, according to the present invention, the PCO line and its associated trunk are restored to an idle condition and the call between Tom and the inside party is maintained on line A. Thus, the conditions of the LEDs indicate the true condition of line A (i.e., busy) and line PCO (i.e., idle). In the dedicated appearance case, however, it should be noted that the conditions of the LEDs do not change from the conference state 306 when the outside party hangs up. This result can confuse a telephone user.

Additionally, in 308, line PCO is forced into an ambiguous state where the conditions indicated by its LEDs are not the true conditions on line PCO. In the dedicated appearance case, 308, the PCO line and its trunk circuit must be held busy, because Tom is talking to the inside party via the dedicated PCO line appearance. Thus, even though the party on line PCO has hung up, the LEDs at the PCO appearance give the indication that Tom is talking to an outside party over line PCO, when in fact Tom is talking to an inside party and line PCO is actually idle. This ambiguity is compounded if an incoming call arrives on Tom's PCO line.

The ambiguous state described above occurs only whena conference call involves a dedicated appearance button, such as a PCO line discussed above. Similarly such an ambiguous condition can arise when other dedicated appearance buttons such as second extensions, automatic intercom, etc. are used together with general appearance lines. If the conference call involves two general appearance lines no ambiguous conditions exists. According to the present invention, air calls independent of the type (i.e., CO line, personal CO line (PCO), second extension, automatic intercom, etc.) are handled in the same manner. Therefore, no ambiguity results.

DETAILED SYSTEM OPERATION

Figure 4:
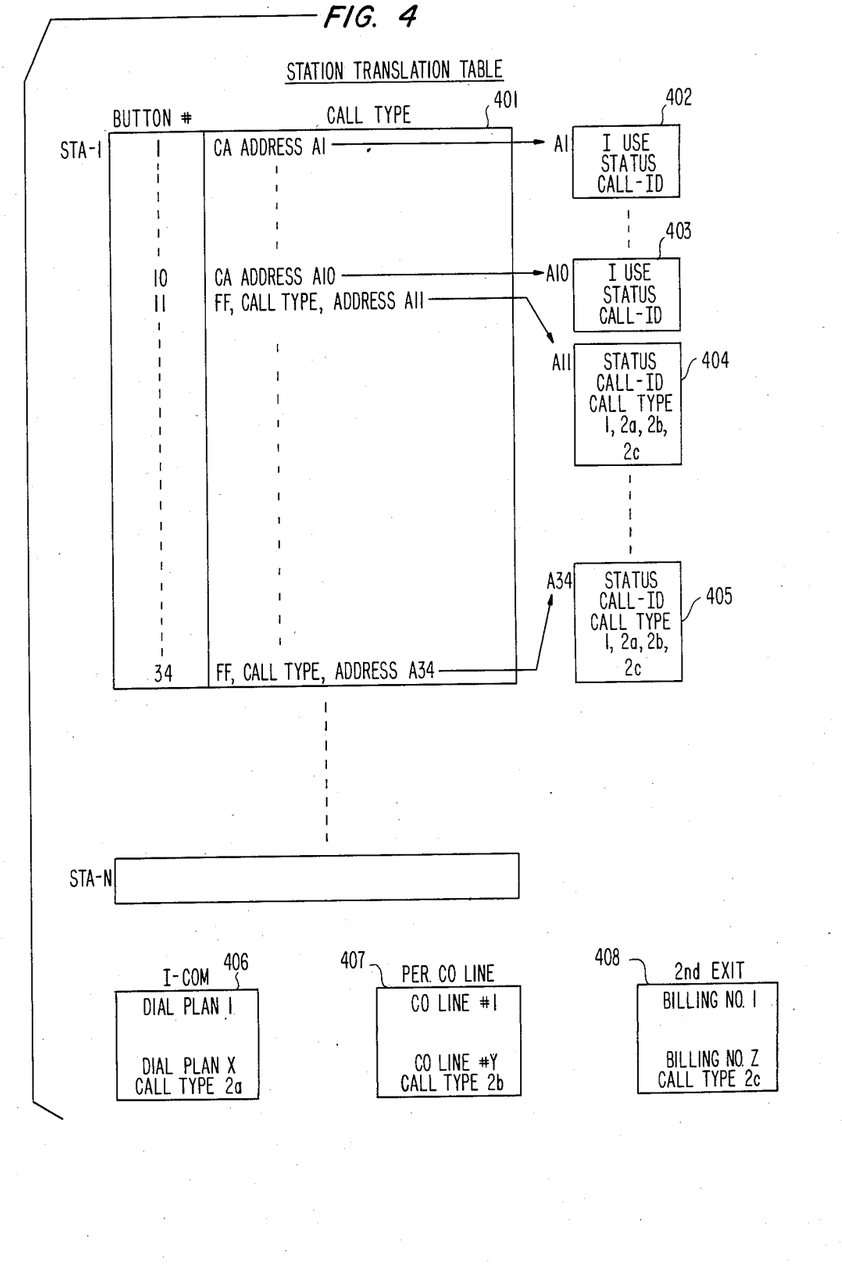
FIGS. 4–6 shows various translation and status tables used with the present invention.
Figure 5:
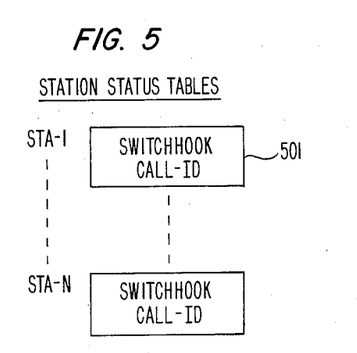
Figure 6:
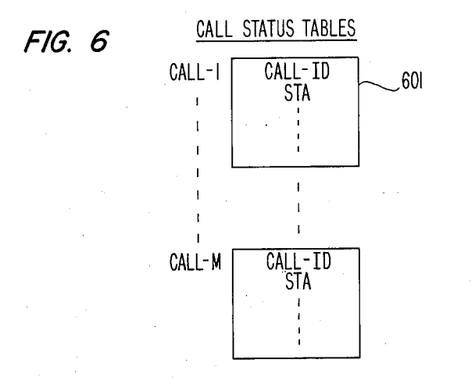

According to the present invention, the system requires the data structures shown in FIGS. 4, 5 and 6. In FIG. 4, for each station (STA-N) a station translation table 401 and associated station button status tables 402–405 are established. In FIG. 5, for each station set STA-1 through STA-N of the system a station status table is established and initialized by setting the switchhook status to an onhook condition and the call ID to the null condition. In FIG. 6, call status tables are established to store call identification and station set associated with each such call (call-1 through call-M).

Returning to FIG. 4, for each station set, e.g., STA-1, a station translation table 401 is configured to match the number and type of buttons that the station user has on station set STA-1. Since in FIG. 2 we have shown a station set with 10 general call appearance (CA) buttons and 24 feature function (FF) buttons, the station translation table must have 34 button entries. If a button (e.g., button 1 of STA-1) is to be a general call appearance button, the "type" entry of the station translation table is set to call apperance (CA) and an address word (A1) is entered. This address word A1 points to a button translation table (402) containing the status information for button 1 of station STA-1. This process is repeated for each call appearance button at station STA-1. The CA button translation tables (402, 403 and 404) are initialized to an idle condition with I-use set to "off", status set to "off", and call ID set to "null". While the station set illustrated in FIGS. 2 and 4 contains 10 call appearance (CA) buttons and 24 feature function (FF) buttons, it is contemplated that any number of buttons can be incorporated into a station set.

For each feature function (FF) button (11 through 34) there is also an entry in the station translation table 401. The "call type" entry is also made for each feature function (FF) button. The call type is encoded to match the call type that the user desires at that button. A feature function FF button could select a call type such as a personal CO line, an intercom, an automatic intercom, or secondary extension. Another field of the station translation table includes an address (A11-A34) which points to an associated button translation table (404-405) for each FF button. Illustratively as shown in table 406, call type 2a is designated as intercom calls and various dialing plans 1-X are shown. Call type 2b is designated as personal CO line calls and the various lines CO line 1-Y are listed in table 407. Table 408 lists the billing numbers 1-Z used for secondary extensions and designated as call type 2c.

Additionally, a CO line could be installed as a personal line on an FF button by storing the information call in the "call type" field of the station translation table. Correspondingly, an address pointer in that table would be made to point to the button status table for that FF button. The button status for all feature function (FF) buttons is initialized with status set to "off" and call ID set to "null". This process is repeated for every button of every station in the system. After the data structures of FIGS. 4, 5 and 6 have been established, the features are now operable using these data structures.

These data structures have been described for a station set having 10 call appearance buttons and 24 feature function buttons, FIG. 2. It is obvious how to customize these tables for a variety of station types. These tables could be used by stations with no feature function buttons (i.e., no entries for buttons 11-34 of FIG. 4) or with varying numbers of buttons.

FEATURE OPERATION

As the following detailed description is read, two things should be noted. First, in the flowcharts and descriptions which follow, the presence of a feature function button at a station set is not presumed. Thus, the presence or absence of an FF button does not change the system operation. This allows station set users to have access to incoming special calls (such as intercom, secondary extension and personal CO lines) without requiring feature function buttons for those call types. Second, the same flowcharts and descriptions are used for all call types (i.e., calls of the first and second type). There are no operational differences at the station set amoung any of the call types. This allows a single sequence of operations to be developed and maintained thus simplifying the communication system.

Figure 7:
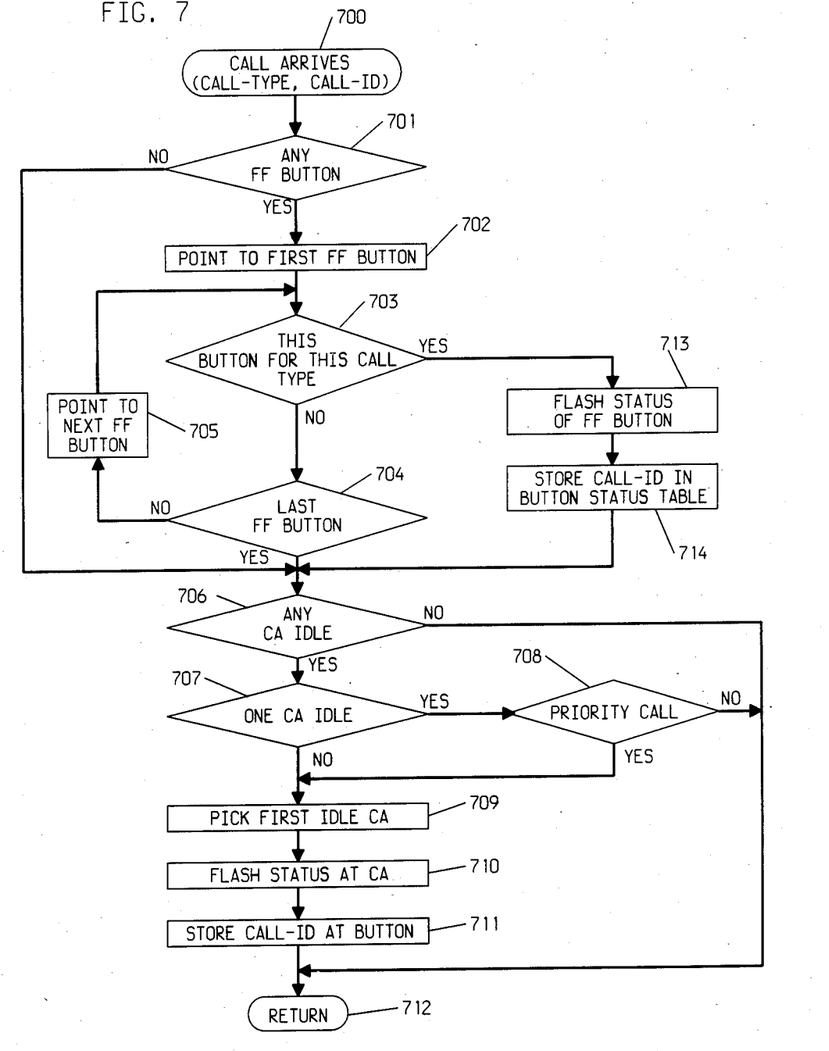
FIGS. 7–12 show typical program flow charts of the claimed invention.

Assume that the data structures described in FIG. 4 have been constructed and that an incoming call arrives and has been routed to a station STA-1 in a well known manner. Thereafter, the steps taken by the system to assign an FF button (if present) and/or a CA button to the received call are shown in FIG. 7. When a call arrives, 700, the call type and call identification are known. The first step, 701, determines if an FF button exists at the called station set. If not, step 706 is performed. If a FF button exists, steps 702-705 search through all the feature function buttons at station STA-1 (i.e., buttons 11-34 of station STA-1 of FIG. 4) for a call type that matches the type of call that is arriving.

If a FF button match is found in step 703 (e.g., button 11 of FIG. 4), the steps shown in 713 and 714 set, in the associated station button status table (i.e., 404 of FIG. 4), the status of that feature function button to flashing and stores the call ID associated with the arriving call.

In step 706, the system also tries to assign a call appearance button to the incoming calls. A search is made through the CA buttons (buttons 1-10) in the status table looking for idle call appearances at station STA-1. If there are no idle call appearances, the program returns, 712, to the main program and starts the feature function (FF) button flashing. (This results in an indication of an incoming call associated with an FF even though the station has no idle call appearance).

If there are idle call appearances, the number is checked in step 707. If there is only one call appearance (CA) idle and the received call is not a priority call, step 708, the program returns, 712, to the main program. The steps 707 and 708 thus reserves the last idle CA button for assignment only to a priority call. Obviously a CA button could be reserved for one of the other of the second type of calls. Moreover, as shown by 802 of FIG. 8, a CA button can be used to initiate a call even if it is the last CA button. Again, this is a matter of design choice. If there is more than one idle call appearance, or if there is only one idle call appearance and this is a priority call arriving at the station set STA-1, the first idle call appearance button at the station set is dynamically allocated. The system controls the visual display on LED status of this call appearance button, sets it to flashing, 710, and the call ID is stored in the button status table for that button, 711. FIG. 7 shows that when a call arrives a feature function button which matches the call type is selected as is an idle call appearance button if possible, and the associated lamps are updated at those buttons to show that there is an incoming phone call.

Figure 8:
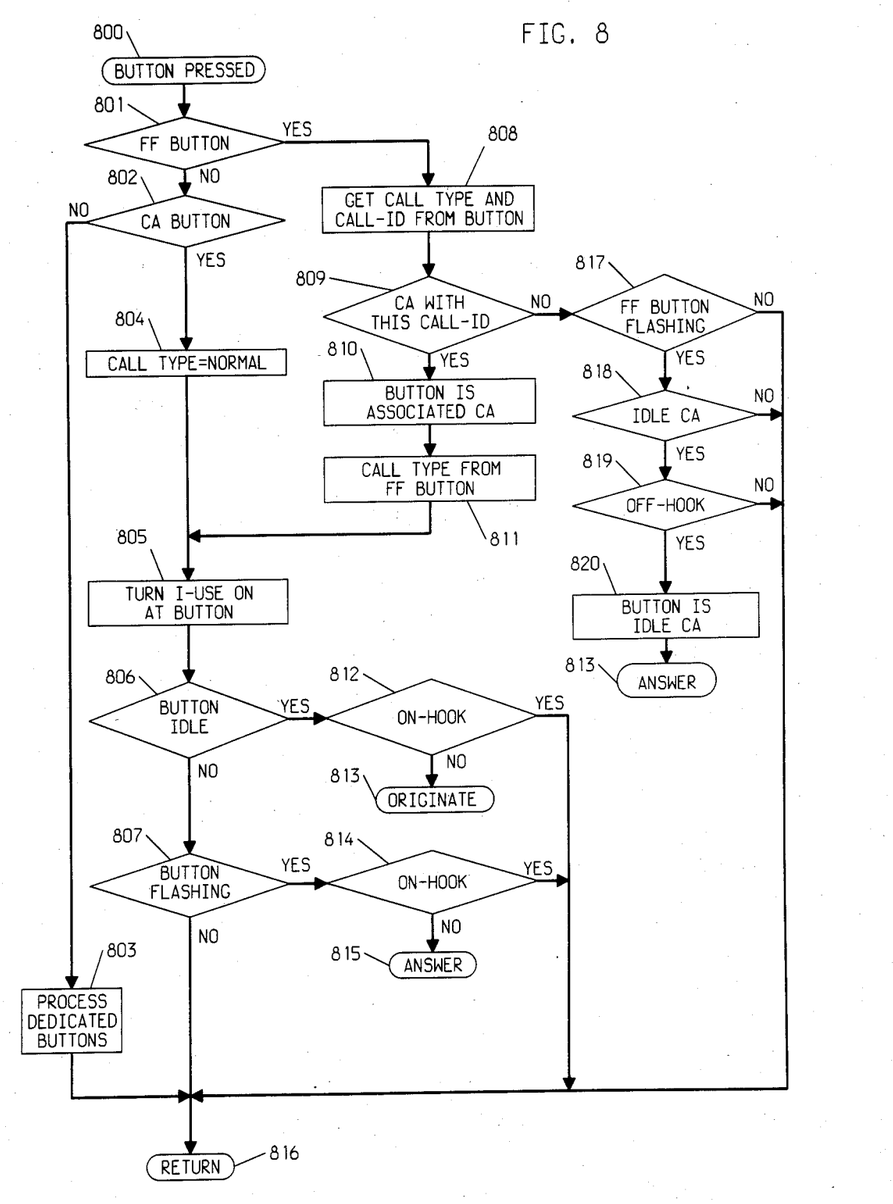

With reference to FIGS. 4 and 8, assume that station STA-1 is now in some arbitrary state and that a button is pushed, 800, at that station. The program actions that are taken are outlines in FIG. 8. Once a button is pressed, it is determined if this is a feature function button or not, which is shown in step 801. This is done by checking the station translation table of FIG. 4. If it is a feature function button that was pressed, e.g., button 34, the program gets the call type and call ID from the button status table, 405, for that feature function button as shown in step 808.

Thereafter, in step 809, the program searches through the button status table for all the call appearance buttons (1–10) at station STA-1 to find a call appearance button associated with that call ID. This search is necessary because the associated call appearance (if there is one) is not always the same button since the CA button was dynamically assigned when the call arrived at the station set. If there is a call appearance button associated with this call ID, steps 810 and 811 are taken and the program treats the call as if that CA button was pressed. Let us assume that this action is taken. In step 805, the program turns the I-use LED "on" at that call appearance button. If that button was idle, 806, and station STA-1 is on-hook, 812, the program does not do anything but returns to the main program, 816. If the button was idle and station STA-1 was off-hook, the program then originates a phone call, 813. If the button was not idle but was flashing, 807, and station STA-1 was on-hook, 814, the program ignores the flashing and returns to the main program, 816. If the button was flashing and station set STA-1 was off-hook, the phone call is answered, 815.

Another case occurs when button 802 is pushed. In such a case, the appropriate normal call processing steps 804, 805, 806, 807, 812–816 are followed. If the button pressed was neither a FF, (801) or a CA (802), button, the program processes the feature, 803, initiated by the dedicated button (see 205 of FIG. 2) and then returns control to the main program, 816. A third possible case is a button depression, shown again in FIG. 8, is where a feature function button is pushed and there was no call appearance found with that call ID as in step 809. At this point, 817, if the feature function was flashing and if there was an idle call appearance, 818, and if the station was off-hook, 819, the program answers a call on that idle call appearance. Note that a search of all the CA buttons for an idle button is necessary since they are dynamically assigned as calls arrive at the station set. If any of steps 818, 819 or 820 is negative, the program returns, 816, to the main program.

Figure 9:
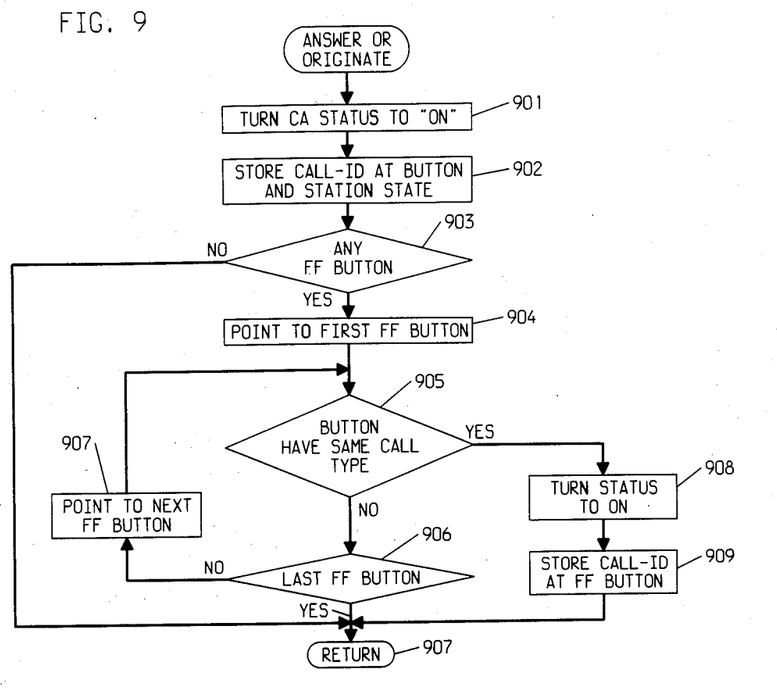

The call, answer and originate subroutines are identical with respect to the station state as shown in FIG. 9. Obviously with regards to the overall system operation, the answer and originate are different functions. These subroutines are used in a variety of places in handling general call appearances. From the point of view of the station set, these subroutines have the same function, that is to make the lamps represent the state that the station sets are in. When a call is initiated from or answered at a station set, the respective answer or originate subroutine is called by the main program. The status LED of the given call appearance button is turned "on", 901, and the call ID of the call that is being originated or answered at the button is stored, 902, as is the state of the station set. This information is stored in a button status table such as 402 of FIG. 4. The subroutine searches through all the feature function buttons, 903, at the station to determine if there are FF buttons. If there are no FF buttons, the subroutine returns, 907, to the main program. If there are FF buttons, these buttons are checked to determine if one has the same call type as the type of call that is being answered or originated. These are the steps 904–907 shown in FIG. 9. If no FF buttons are found having the same call type, the subroutine returns, 907, to the main program. If an FF button is found which matches the call type, the status LED is set to "on", 908, and together with the call ID is stored in the FF button status table (e.g., 404 of FIG. 4) in step 909. Thereafter, the subroutine returns, 907, to the main program.

Figure 10:
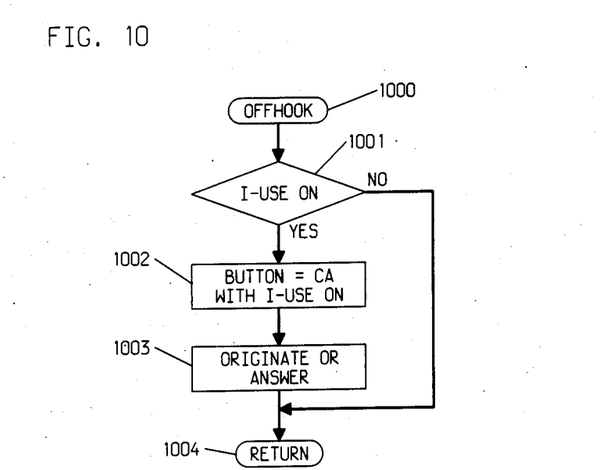

Another action to consider is that of a station set going off hook. The action that the program takes is shown in FIG. 10. When the station goes off-hook, 1000, all the call appearances (CA) for that station are checked to see if the I-use LEDs are turned "on". This is shown in step 1001. If there are no I-use LEDs "on" at that station set, the subroutine returns to the main program, 1004. If an I-use LED is "on", the subroutine either originates or answers (as described in FIG. 9) depending upon the status LED. This is shown in steps 1002 and 1003 of FIG. 10.

Figure 11:
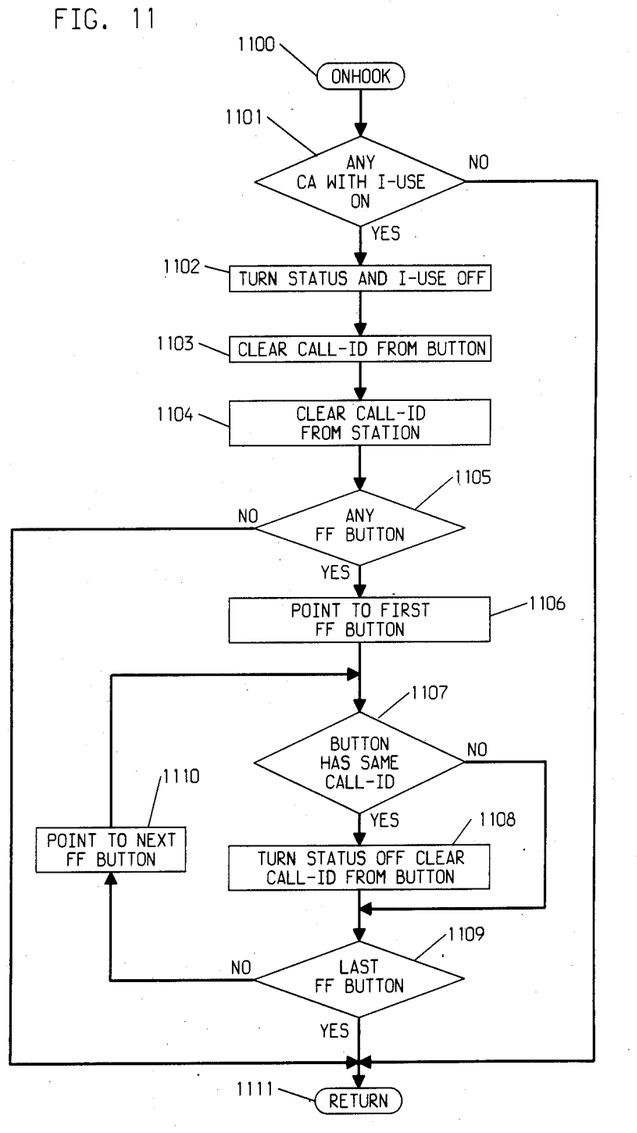

The last possible state change is a station set going on-hook. This subroutine is shown in FIG. 11. After going on-hook, 1100, the subroutine checks, 1101, if there are any call appearances (CA) with the I-use LED turned "on" at the station set. If there is none, no further action is taken and the subroutine returns control to the main program, 1111. If there is an I-use LED turned "on", the subroutine turns the status and I-use LED "off" for that button, 1102; clears, 1103, the call ID from the button status table (e.g., 402 of FIG. 4); clears, 1104, the call ID from the station state table (e.g., 501 of FIG. 5); and sets the switchhook to an on-hook condition in that station state table. The subroutine then checks, 1105, if an FF button exists. If no FF button exists, then the subroutine returns to the main program, 1111.

If an FF button exists, the subroutine then checks through all the feature function buttons associated with that station, 1106. The subroutine checks, 1106–1109, for a feature function (FF) button having the same call ID as the call that was just dropped from the call appearance button. If there is an FF button found with a matching call ID, the status of that FF button is turned "off" and the call ID is cleared in the button state table (e.g., 404 of FIG. 4). Thereafter, the subroutine returns control, 1111, to the main program.

Figure 12:
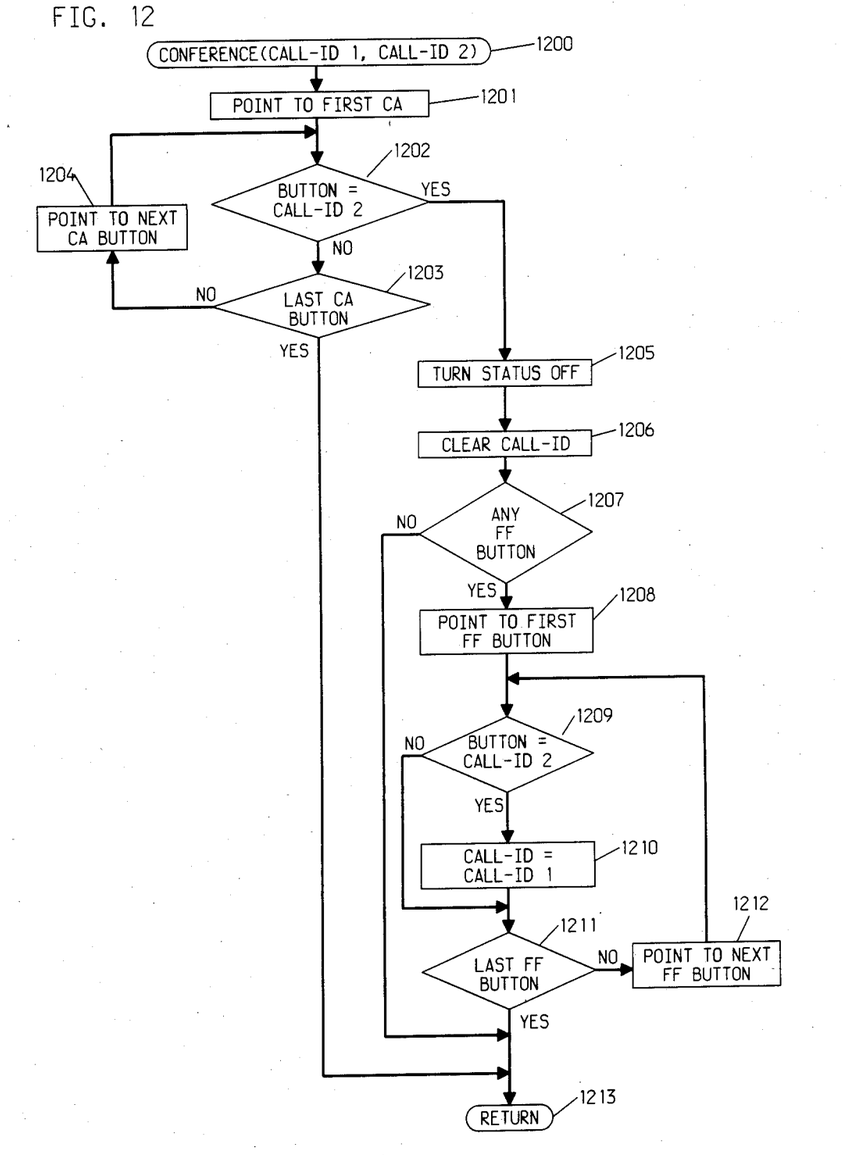

The last state change that can affect a station set is that there could be a conference call setup. This conference call in general can be invoked from either the station set or from another party on the call. For the purposes of this feature, a conference call can be requested in any of the well known manner. It is assumed that somehow using call status tables, 601, the system has determined that the two calls that are at a station set will be conferenced together. The operation of this invention with a conference feature subroutine is illustrated in FIG. 12. The system knows the call-ID for both calls to be conferenced together, 1200. The first step is to search through all the call appearances at the station set looking for call appearances that have an instance of call ID number 2 (call ID2). The subroutine searches until it finds a call appearance (CA) button with a call ID2. This is shown in steps 1201–1204. If no such CA button is found, the subroutine returns, 1213, to the main program. When a button with the call ID2 is found, 1205, the status for that button is turned "off", and the call ID is cleared, 1206, (i.e., in button status table, such as 402 of FIG. 4). Thereafter, the subroutine checks if an FF button exists, 1207. If not, the subroutine returns to the main program, 1213. If an FF button exists, the subroutine goes through all the FF buttons at that station looking for FF buttons that were associated with call ID2. As the subroutine goes through the FF buttons, if it finds one that was assigned to call ID2, the call ID entry is changed to call ID number 1 in the button status table and this is done for each possible FF button. These steps are shown by 1209-1211 of FIG. 12. Thereafter, the subroutine returns to the main program, 1213.

What has been disclosed is merely illustrative of the present invention. Other arrangements and methods can be implemented by those skilled in the art without departing from the spirit and scope of the present invention.

What is claimed is:

1. A communication system including a common control and a station having a capability of receiving a call over a shared facility and a call over a dedicated facility, said station comprising a call appearance button for initiating at said station a first type of call selected from a group of call types including a shared facility call and a dedicated facility call, said common control comprising means responsive to a received call of said group of call types to said station for dynamically assigning said received call to said call appearance button at said station.

2. The communication system of claim 1 wherein said station includes means for initiating a second type of call selected from said group of call types and wherein said common control further comprises means responsive to the operation of said initiating means at said station for assigning said second type of call to said call appearance button at said station.

3. The communication system of claim 2 wherein said means for initiating said second type of call at said station is a second type of button.

4. The communication system of claim 3 wherein said second type of button at said station has an associated visual display and wherein said common control includes means for controlling said associated visual display in response to the operation of said second type of button at said station.

5. The communication system of claim 1 wherein said call appearance button has a visual display associated therewith and wherein said assigning means includes means for controlling said visual display at said call appearance button.

6. The communication system of claim 1 wherein said common control further comprises means for changing a connection to an initiated shared facility or dedicated facility call in rsponse to the operation of a feature initiating means at said station.

7. The communication system of claim 6 wherein said feature initiating means is a third type of button at said station.

8. The communication system of claim 1 wherein said station contains at least two call appearance buttons and wherein said common control further comprises means for reserving one of said at least two call appearance buttons at said station for assignment only to a received dedicated facility call at said station.

9. The communication system of claim 1 wherein said station includes a plurality of call appearance buttons and wherein said common control further comprises means for receiving one of said plurality of call appearance buttons for assignment only to a received predetermined one of a plurality of dedicated facility calls.

10. The communication system of claim 1 wherein said station includes a plurality of call appearance buttons and wherein said common control further comprises means for reserving one of said plurality of call appearance buttons for assignment only to either a received predetermined type of a plurality of dedicated facility calls or a shared facility call initiated at said station using one of said plurality of call appearance buttons.

11. A method of operating a communication system including a common control and a station having a capability of receiving a shared facility call and a dedicated facility call, said method comprising the steps of:

at said station, initiating at a call appearance button a first type of call selected from a group of call types including a shared facility call and a dedicated facility call, and at said common control, assigning received shared facility and dedicated facility calls to said call appearance button at said station.

12. The method of claim 11 wherein said station includes means for initiating a second type of call selected from said group of call types, said method at said common control further comprising the step of:

assigning said second type of call to said call appearance button at said station in response to the operation of said initiating means at said station.

13. The method of claim 11 wherein said station contains at least two call appearance buttons, said method further comprising the step of:

reserving one of said at least two call appearance buttons at said station for assignment only to a received dedicated facility call at said station.

14. The method of claim 11 wherein said station includes a plurality of call appearance buttons, said method further comprising the step of:

reserving one of said plurality of call appearance buttons for assignment only to either a received predetermined type of a plurality of dedicated facility calls or a shared facility call initiated at said station using one of said plurality of call appearance buttons.

* * * * *